_US008098324B2_

(12) United States Patent
Ueno et al.

(10) Patent No.: US 8,098,324 B2
(45) Date of Patent: *Jan. 17, 2012

(54) IMAGING DEVICE, GPS CONTROL METHOD, AND COMPUTER PROGRAM

(75) Inventors: Ichiro Ueno, Saitama (JP); Hitoshi Mitani, Kanagawa (JP); Baiping Liao, Saitama (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,176

(22) Filed: Nov. 5, 2010

(65) Prior Publication Data

US 2011/0050891 A1  Mar. 3, 2011

Related U.S. Application Data

(63) Continuation of application No. 11/633,670, filed on Dec. 4, 2006, now Pat. No. 7,843,506.

(30) Foreign Application Priority Data

Dec. 7, 2005  (JP) ................................ P2005-353010

(51) Int. Cl.
*H04N 5/225* (2006.01)
(52) U.S. Cl. .................... 348/372; 342/357.74
(58) Field of Classification Search .......................... None
See application file for complete search history.

(56) References Cited

U.S. PATENT DOCUMENTS

| 6,181,878 | B1 * | 1/2001 | Honda ........................ 396/310 |
| 6,995,792 | B1 | 2/2006 | Ogura |
| 7,026,984 | B1 | 4/2006 | Thandu et al. |
| 7,333,054 | B2 | 2/2008 | Ueno et al. |
| 2001/0012451 | A1 | 8/2001 | Ohkado |
| 2001/0014222 | A1 | 8/2001 | Honda et al. |
| 2005/0275587 | A1 | 12/2005 | Siegel et al. |

FOREIGN PATENT DOCUMENTS

| EP | 0 855 835 | 7/1998 |
| JP | 10-150622 A | 6/1998 |
| JP | 2001-166366 A | 6/2001 |
| JP | 2001-242235 A | 9/2001 |
| JP | 2001-309418 A | 11/2001 |
| JP | 2002-296055 A | 10/2002 |
| JP | 2005-218086 A | 8/2005 |
| JP | 2007-155577 A | 6/2007 |
| JP | 2007-158887 A | 6/2007 |
| WO | 00/13034 | 3/2000 |

* cited by examiner

*Primary Examiner* — Lin Ye
*Assistant Examiner* — Dennis Hogue
(74) *Attorney, Agent, or Firm* — Lerner, David, Littenberg, Krumholz & Mentlik, LLP

(57) ABSTRACT

An imaging device includes an imaging unit configured to execute processing to capture image data, a global positioning system (GPS) device configured to execute position calculation processing based on data received from a satellite, and a main controller configured to measure an imaging frequency of the imaging unit, to determine or update a control parameter as a condition for a transition of an operation state of the GPS device based on the measured imaging frequency, and to cause a transition of the operation state of the GPS device based on the determined or updated control parameter.

15 Claims, 11 Drawing Sheets

FIG. 7

| | CONTROL PARAMETER SET VALUE | | | | |
|---|---|---|---|---|---|
| | A | B | C | D | E |
| L1 (m0≦m<m1) | a1 | b1 | c1 | d1 | e1 |
| L2 (m1≦m<m2) | a2 | b2 | c2 | d2 | e2 |
| L3 (m2≦m) | a3 | b3 | c3 | d3 | e3 |
| IMAGING FREQUENCY LEVEL | | | | | |

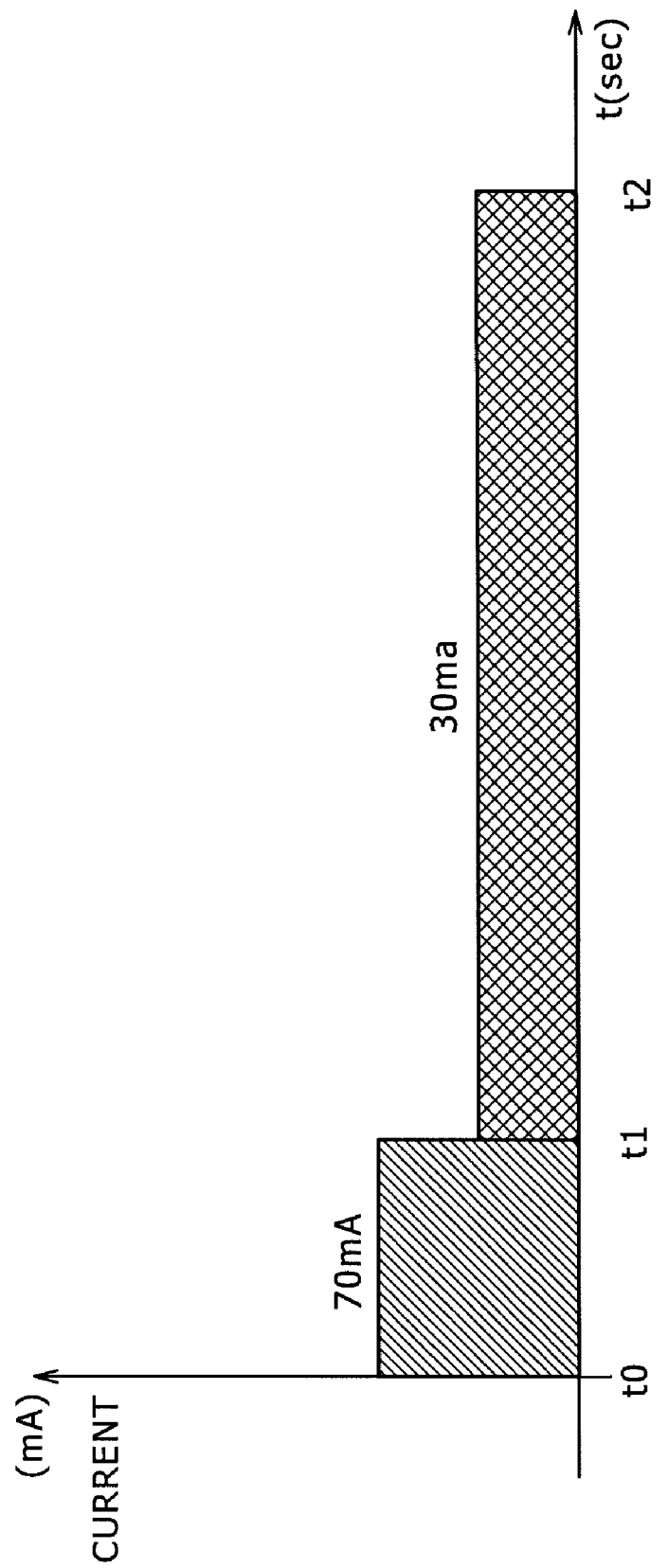

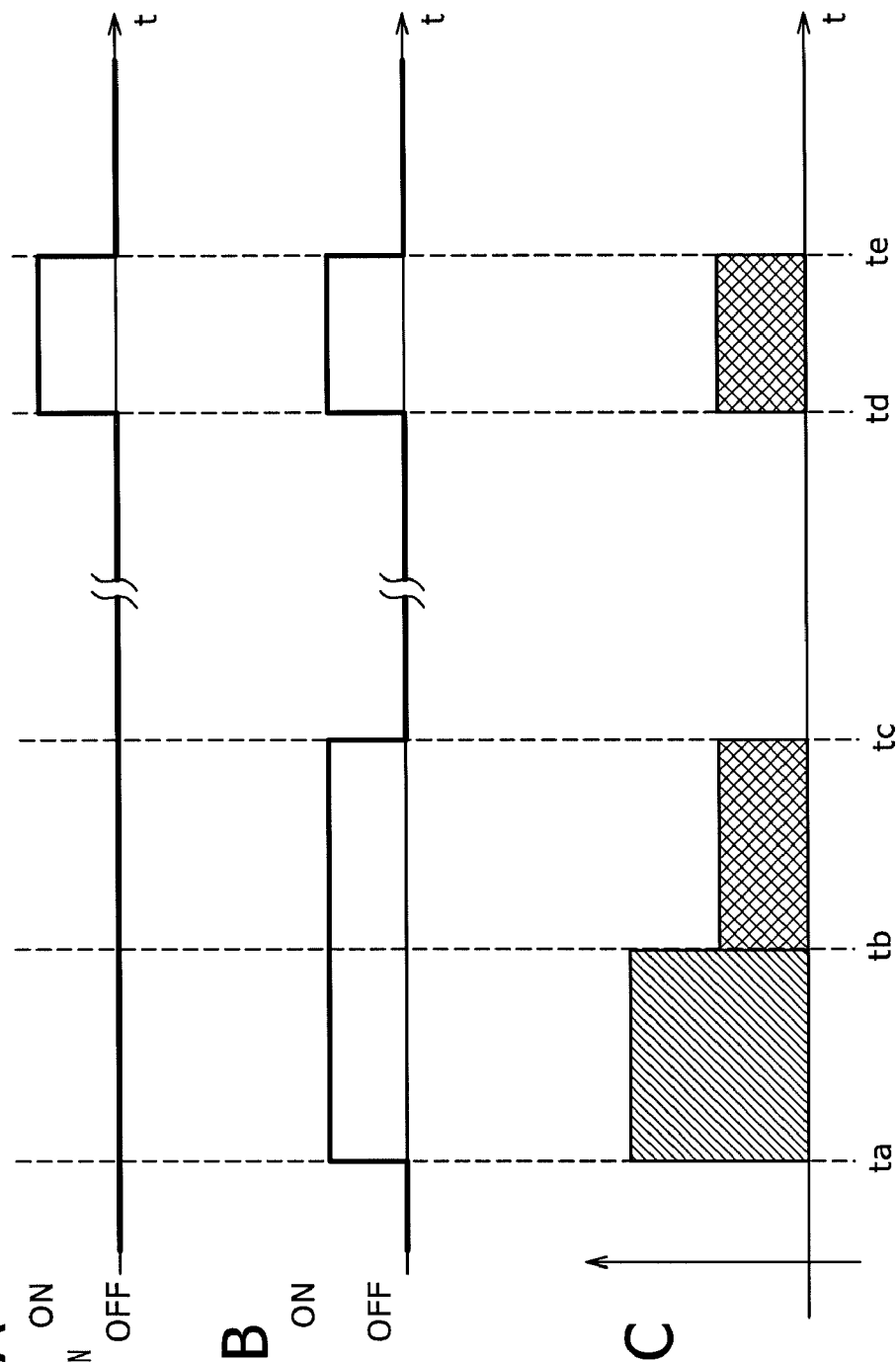

IMAGING DEVICE, GPS CONTROL METHOD, AND COMPUTER PROGRAM

CROSS-REFERENCE TO RELATED APPLICATIONS

This application is a continuation of U.S. application Ser. No. 11/633,670, filed on Dec. 4, 2006, which claims priority from Japanese Patent Application No. JP 2005-353010 filed on Dec. 7, 2005, the disclosures of which are hereby incorporated by reference herein.

BACKGROUND OF THE INVENTION

1. Field of the Invention

The present invention relates to an imaging device, a GPS control method, and a computer program. More specifically, the invention relates to an imaging device, a GPS control method, and a computer program that each implement, for a device that executes position measurement by employing a global positioning system (GPS), drive control of the GPS depending on the frequency of execution of imaging processing to thereby realize reduced power consumption.

2. Description of the Related Art

In recent years, imaging devices such as video cameras and still cameras equipped with a global positioning system (GPS) function have been proposed and used. These imaging devices acquire position information and record the acquired position information as attribute information of imaging data.

In such application products of the GPS technique, a GPS reception module is typically supplied with power so that signals from satellites are continuously received and analyzed when the apparatus is being used in general. However, imaging devices such as video cameras and still cameras employ a cell as a power source, and hence it is an important challenge for these imaging devices to suppress power consumption.

For an apparatus that employs a cell as its power source and includes a GPS reception module, continuous supply of power to the GPS reception module leads to a problem that excessive power consumption is caused and therefore the cell is exhausted soon. As one of solutions to reduce this power consumption, a system would be available that employs execution of the necessary minimum energization for the GPS reception module, such as intermittent energization and intermittent driving therefor. However, the intermittent driving causes a problem that the waiting period from activation of the GPS module until acquisition of position information is increased.

To decrease the waiting period until position acquisition, it is necessary to effectively utilize navigation message information of a GPS satellite, called navigation data and received by the GPS module from the satellite, to thereby complete satellite acquisition, i.e., processing of reception of electric waves from the satellite, in a short period. However, navigation messages have the expiration time defined as the validity period (validity periods of almanac data and ephemeris data included in navigation messages are three months and two hours, respectively).

In a configuration that continuously receives navigation messages, constant data updating is allowed and thus navigation messages (almanac data and ephemeris data) within the validity period are stored so that rapid satellite acquisition is permitted by use of the stored navigation messages. However, when the above-described intermittent driving is implemented, there is a case where data recorded in the GPS module has expired. In this case, efficient satellite acquisition by use of these data cannot be carried out, execution of a satellite acquisition process that takes comparatively long processing time is requisite. As a result, the period from activation of the GPS module to acquisition of position information is greatly extended, which possibly causes a problem that timely position information cannot be acquired.

For example, in a configuration in which a GPS module is provided for a video camera or still-image camera and processing for adding position information acquired from the GPS module as attribute information of imaging data is executed, it is requisite to obtain accurate position information at the timing when a user starts imaging. However, if the period from activation processing to acquisition of position information is extended due to the above-described intermittent operation, a problem that accurate position information corresponding to imaging data cannot be obtained occurs.

SUMMARY OF THE INVENTION

The present invention is made in view of the above-described problem, and there is a need for the invention to provide an imaging device, a GPS control method, and a computer program that each implement, for an imaging device equipped with a GPS module, drive control of the GPS depending on the frequency of execution of imaging processing to thereby realize reduced power consumption.

According to a first embodiment of the present invention, there is provided an imaging device that includes an imaging unit configured to execute processing to capture image data, a global positioning system (GPS) device configured to execute position calculation processing based on data received from a satellite, and a main controller configured to measure an imaging frequency of the imaging unit, and to determine or update a control parameter as the condition for a transition of the operation state of the GPS device based on the measured imaging frequency. The main controller causes a transition of the operation state of the GPS device based on the determined or updated control parameter.

According to a second embodiment of the invention, there is provided a GPS control method in an imaging device including a global positioning system (GPS) device. The method includes measuring an imaging frequency of an imaging unit that executes processing to capture image data, determining or updating a control parameter as the condition for a transition of the operation state of the GPS device based on the measured imaging frequency, and causing a transition of the operation state of the GPS device based on the determined or updated control parameter.

According to a third embodiment of the invention, there is provided a computer program for causing execution of a global positioning system (GPS) control method in an imaging device including a GPS device. The method includes measuring an imaging frequency of an imaging unit that executes processing to capture image data, determining or updating a control parameter as the condition for a transition of the operation state of the GPS device based on the measured imaging frequency, and causing a transition of the operation state of the GPS device based on the determined or updated control parameter.

The computer program according to the third embodiment can be provided by a storage medium, such as a CD, FD or MO, or by a communication medium, such as a network that provides a program in a computer-readable format to a general-purpose computer system capable of executing various program codes. Providing such a program in a computer-readable format allows realization of processing on the computer system in accordance with the program.

Still other scopes, features and advantages of the present invention will become apparent from the following more detailed description based on an embodiment of the invention and the accompanying drawings. The term "system" in the present specification refers to a logical assembly of plural devices, and is not limited to an entity in which devices with the respective configurations are included in the same casing.

According to one embodiment of the present invention, in an imaging device such as a video camera or still camera including a global positioning system (GPS) device, the frequency of imaging by a user is measured, so that control parameters as the conditions for transitions of the operation state of the GPS device are determined or updated based on the measured imaging frequency. Furthermore, based on the determined or updated control parameters, transitions of the operation state of the GPS device are implemented. For example, when the use frequency is at a low level, the parameters are updated so that the intermittent operation period during which power is intermittently supplied to the GPS device is set to a long period. Thus, unnecessary power consumption in the GPS device is prevented, which suppresses exhaustion of a battery.

BRIEF DESCRIPTION OF THE DRAWINGS

FIG. 7 is a diagram for explaining a table in which control parameters used for the state transitions in the imaging device of the embodiment are stored;

FIG. 10 is a diagram for explaining the amount of power consumption in a GPS device; and FIGS. 11A to 11C are diagrams for explaining the amount of power consumption in a GPS device.

DETAILED DESCRIPTION

Details of an imaging device, a GPS control method, and a computer program according to an embodiment of the invention will be described below with reference to the drawings.

Figure 1:
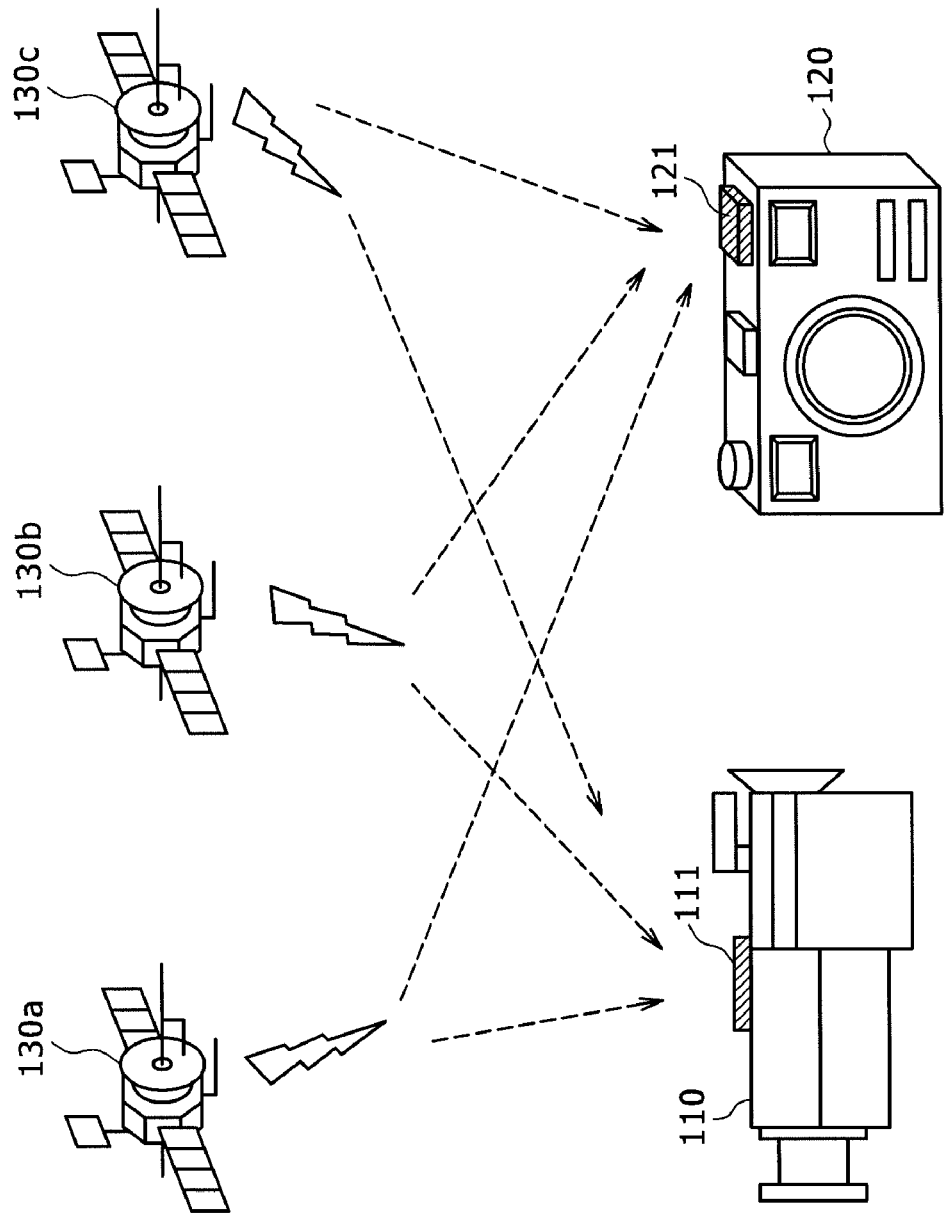
FIG. 1 is a diagram for explaining the outline of processing executed by imaging devices according to an embodiment of the present invention.

Initially, the outline of processing executed by an imaging device according to the embodiment will be described with reference to FIG. 1. FIG. 1 illustrates a video camera 110 that mainly captures moving images and a still camera 120 that captures still images as the imaging device of the embodiment. These imaging devices have GPS modules 111 and 121 on the apparatus main body.

The GPS modules 111 and 121 are formed of e.g. a packaged module that includes an antenna for receiving GPS electric waves, a signal converter for received electric waves, a position information calculator, a temporary storage for calculation results, and a communication unit for executing communication with a controller (CPU) in the main unit of the information processing device (imaging device).

The GPS modules 111 and 121 of the respective imaging devices receive electric waves from GPS satellites 130a, 130b, 130c . . . that exist in outer space and transmit GPS position information, to thereby acquire the present latitude/longitude coordinates on the earth and the time of the reception. The principle of the reception is the same as that of a general GPS reception system.

From each of plural GPS satellites existing in outer space, a navigation message that includes position information indicating the position of the GPS satellite in outer space and time information is transmitted. The GPS modules 111 and 121 determine the position information from the navigation message. The navigation message transmitted from the GPS satellite in outer space contains astronomical almanac data (almanac and ephemeris) as the position information of the satellite and signal transmission time information.

The GPS modules 111 and 121 obtain the three-dimensional positions (x, y, z) of the GPS modules 111 and 121 as the position information. To obtain the three-dimensional position, processing of acquiring at least three GPS satellites is necessary. Specifically, it is necessary to receive navigation messages from at least three GPS satellites of which positions have been identified. Subsequently, by using the information (navigation message) received from these at least three GPS satellites, the positions of the GPS modules 111 and 121 are determined by use of a triangulation method.

The processing for determining the present position of the GPS receiver by use of a triangular method includes two processing steps: Step 1 for GPS satellite acquisition processing and Step 2 for GPS module position determination processing. In Step 1, data is received from at least three GPS satellites from which the GPS modules 111 and 121 can receive navigation messages, so that the positions of the respective GPS satellites are identified. In Step 2, the distances from the GPS modules 111 and 121 to the respective GPS satellites are calculated, so that the positions of the GPS modules with respect to the center of the earth are calculated based on a triangular method.

Of the above-described steps, the processing of Step can be executed through arithmetic processing in the GPS module. In the processing of Step 1, i.e., in the processing of receiving data from at least three GPS satellites from which navigation messages can be received to thereby identify the positions of the respective GPS satellites, acquiring rough position information of the GPS satellites in advance and using the acquired information is effective for shortening of the processing time.

As described above, a navigation message transmitted from a GPS satellite contains astronomical almanac data (almanac and ephemeris) as the position information of the satellite. Therefore, when a GPS module receives data continuously or intermittently, the present position of the satellite can be estimated by using the data that has been already received in the past. If the data that has been received in the past can be utilized, GPS satellite acquisition, i.e., data reception from a GPS satellite, can be carried out efficiently in a short period. That is, the above-described GPS satellite acquisition processing of Step 1 can be implemented rapidly.

However, navigation messages have the expiration time defined as the validity period (validity periods of almanac data and ephemeris data are three months and two hours, respectively). If data within the validity period is held, the present position of the satellite can be estimated by using the data that has been received in the past, and thus the processing of Steps 1 and 2 can be executed efficiently in a short period, which allows rapid calculation of the positions of the GPS modules 111 and 121. In contrast, if data within the validity period is not held, it may be impossible to efficiently estimate the GPS position by use of already acquired data, and implementation of a GPS satellite position search from zero is requisite. It is difficult to shorten the processing time of Step 1 on position searching. As a result, it takes a long time period to calculate positions by using the GPS modules 111 and 121.

If the GPS modules 111 and 121 are always operated to thereby continuously receive navigation messages, a navigation message within its validity period can be held typically, which permits efficient GPS satellite acquisition. For this purpose, however, it is necessary that the GPS modules are continuously supplied with power so as to be driven. However, operating power for the GPS modules 111 and 121 of the imaging devices 110 and 120 is supplied from a cell (battery) of the imaging devices 110 and 120, and it is necessary that exhaustion of the cell is suppressed as much as possible.

The imaging devices 110 and 120 according to an embodiment of the invention are to address this requirement, and are configured to measure the frequency of imaging by the imaging devices 110 and 120 and control the driving of the GPS modules 111 and 121 depending on the measured imaging frequency. Thus, power consumption is reduced, and delay of processing of acquiring position information from the GPS module is prevented so that rapid acquisition of the position information is allowed.

Figure 2:
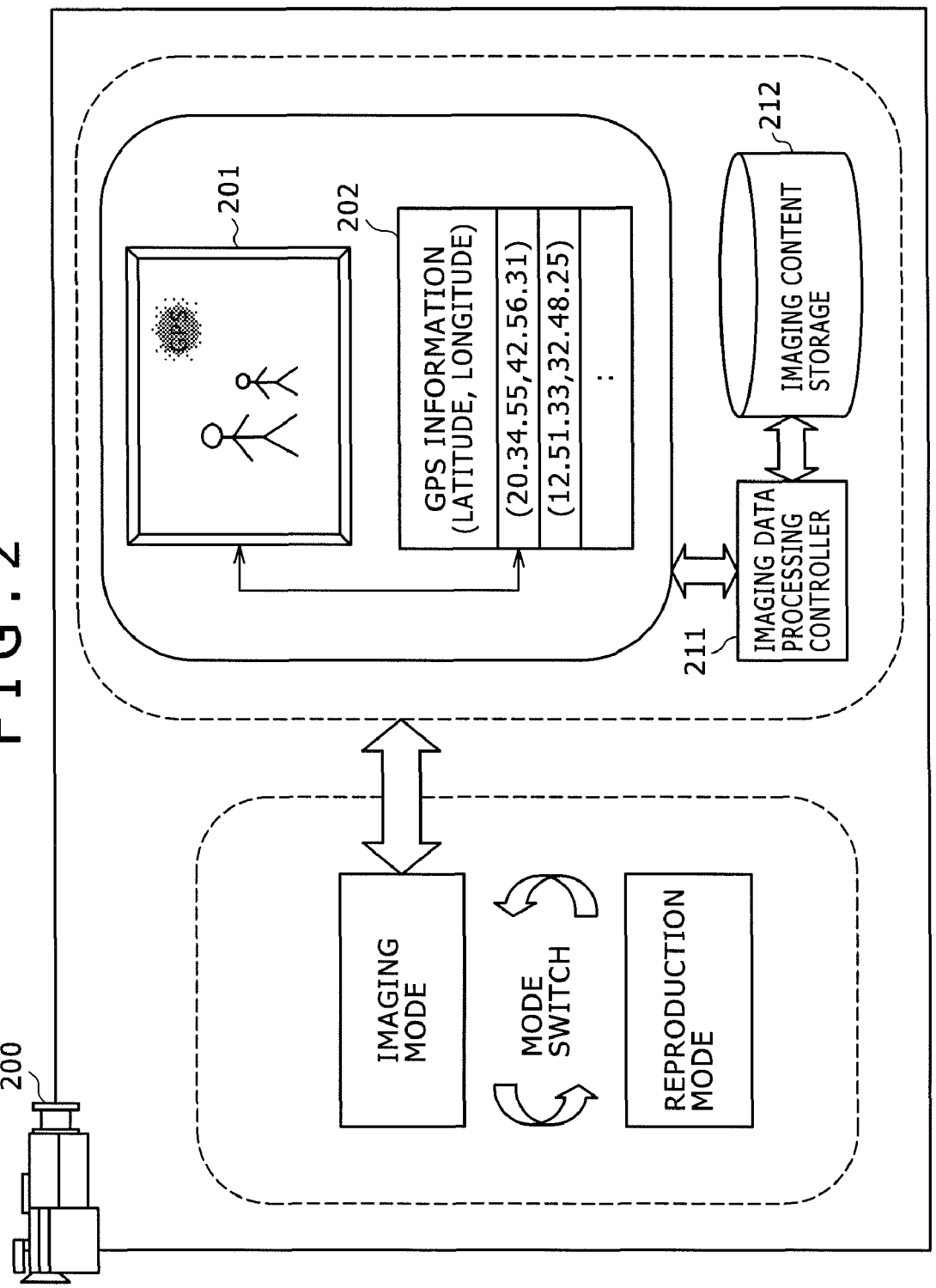
FIG. 2 is a diagram for explaining an example of data processing executed by an imaging device as one embodiment of the invention.

Examples of data processing executed by the imaging device according to the embodiment of the invention will be described below with reference to FIGS. 2 to 4. Referring initially to FIG. 2, an example of processing at the time of image capturing will be described below. As shown in the drawing, an imaging device 200 has, as its operation modes, an imaging mode to capture moving images or still images and a reproduction mode to reproduce data of captured images.

In the imaging mode, as shown in FIG. 2, image data 201 is acquired through imaging processing by the imaging device main unit, and position information (latitude and longitude) 202 of a GPS module is acquired by the GPS module. An imaging data processing controller 211 in the imaging device stores the data and information in an imaging content storage 212 with associating the data and information with each other. That is, the position information (latitude and longitude) 202 acquired by the GPS module is set as attribute data corresponding to image data and is stored in the imaging content storage 212.

Figure 3:
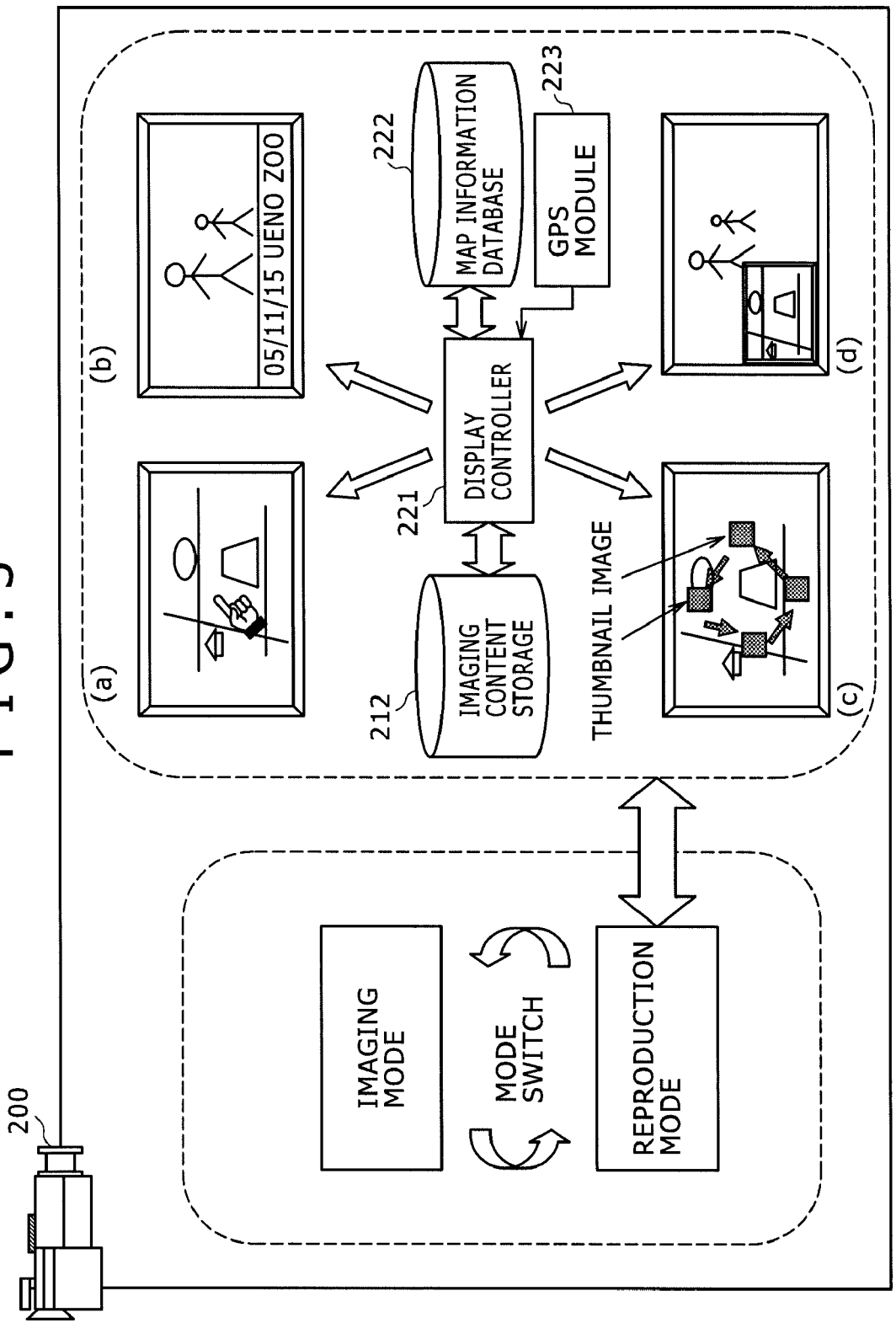
FIG. 3 is a diagram for explaining an example of data processing executed by the imaging device as the embodiment.

Referring next to FIG. 3, an example of processing in the reproduction mode for reproducing data of captured images will be described below. FIG. 3 shows display data examples (a) to (d) that are displayed on the monitor of the imaging device in the reproduction mode. These display data (a) to (d) are created under control by a display controller 221 in the imaging device. The display controller 221 creates display data by acquiring the following data and information: data in the imaging content storage 212, i.e., image data and position information recorded as attribute data of the image data; information in a map information database 222 that includes data such as map, address, and imaging spot information as data associated with latitude/longitude information; and position information input from a GPS module 223.

The display data (a) corresponds to a display example in which map information is displayed on the monitor so that the present position information is offered to a user. This display example is obtained by inputting the present position information from the GPS module 223 and displaying information that clearly shows the present position on a map in accordance with the input position information. This example is equivalent to a display example for typical navigation information.

The display data (b) is an example in which captured image data stored in the imaging content storage 212 is displayed, and the imaging location is represented by characters in accordance with map data and spot information acquired from the map information database 222 based on the position information recorded with being associated with the image data as attribute data thereof.

The display data (c) is a display example in which captured image data stored in the imaging content storage 212 are arranged in the order of the imaging sequence so that transition of the imaging locations is indicated on a map. The imaging data are displayed on the map as thumbnail images.

The display data (d) is an example in which imaging data is displayed in combination with map data. Specifically, based on the position information recorded as attribute data of the imaging data, a map of the region corresponding to the position information is displayed on part of the monitor.

Figure 4:
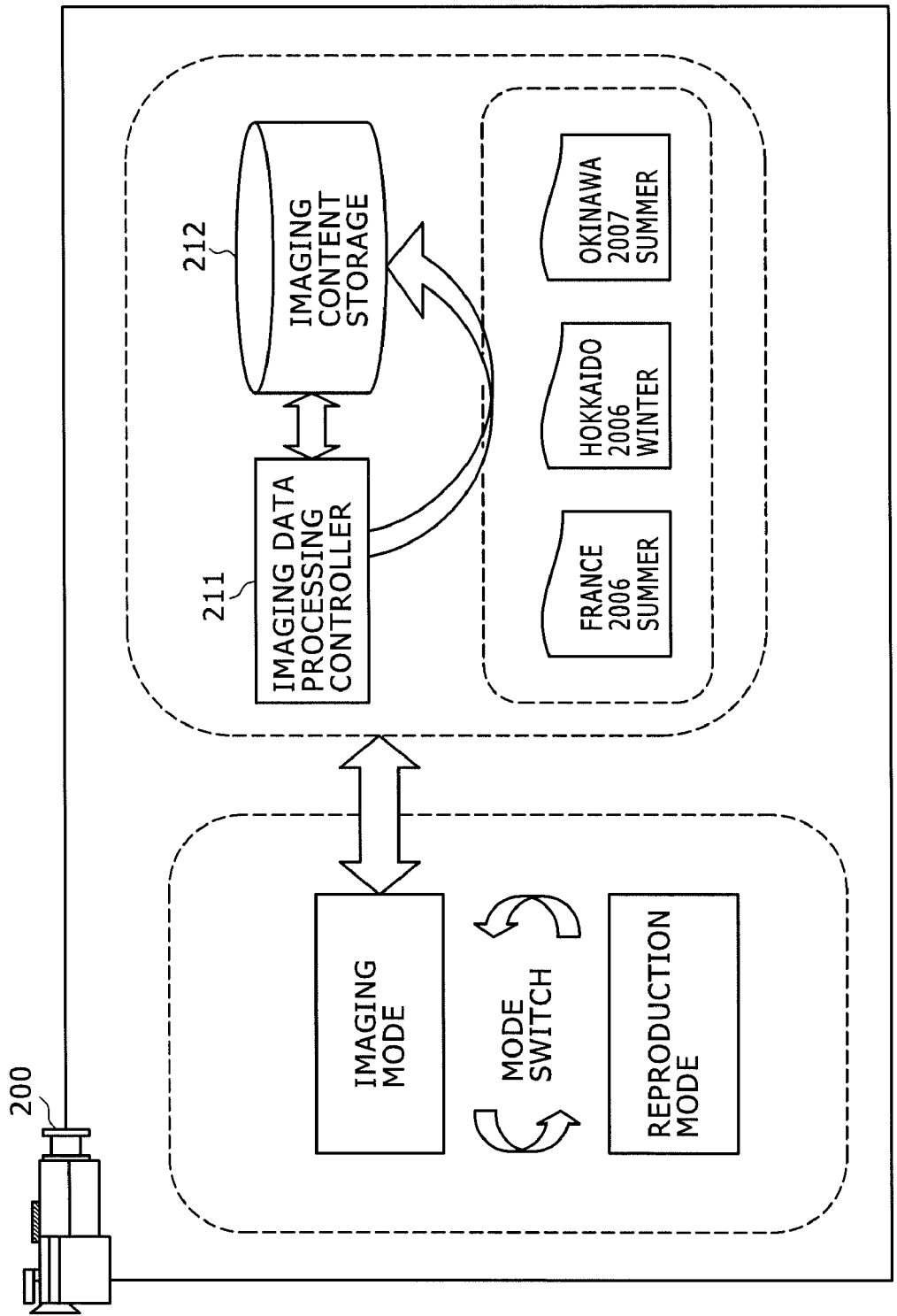
FIG. 4 is a diagram for explaining an example of data processing executed by the imaging device as the embodiment.

Furthermore, in the imaging mode, it is possible to execute processing to, as shown in FIG. 4, collectively store imaging contents in the folder corresponding to the imaging location based on position information as attribute data corresponding to imaging data. For example, through processing in which the imaging data processing controller 211 stores data within a certain latitude/longitude range in one folder such as a folder for which a title of "France 2006 Summer" has been defined based on latitude/longitude information acquired as attribute information corresponding to captured images, imaging data corresponding to a specific region can be collectively stored in one folder. Alternatively, classification based on time information is also possible because imaging date-and-time data is also added to imaging data as attribute information.

In addition to the above-described examples of data processing executable by the imaging device, other various kinds of processing are also possible. For example, also in the imaging mode, it is possible that imaging by a user is assisted based on position information from the GPS module. Specifically, e.g. the following kinds of processing are available: processing of indicating on the monitor whether or not GPS electric waves can be received at the place where imaging is currently being implemented; processing of graphically representing the present position on a screen map like by a car navigation system; and processing of indicating place-name information of the present position on the imaging screen. These kinds of processing can be realized by causing the display controller 221 to execute the processing described with reference to FIG. 3 at the time of imaging.

Figure 5:
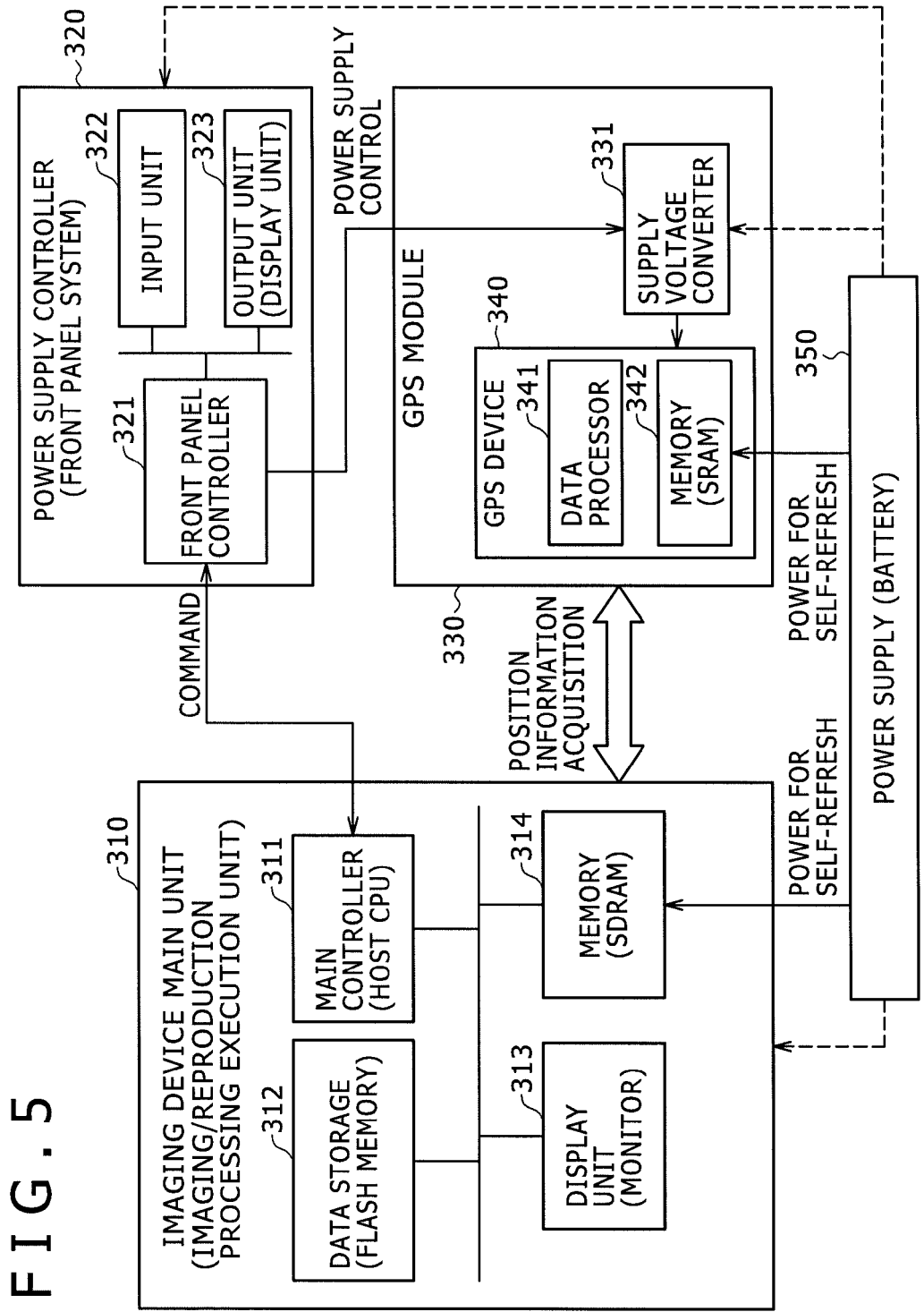
FIG. 5 is a diagram for explaining the configuration of the imaging device as the embodiment.

Referring next to FIG. 5, the configuration of the imaging device as an information processing device according to the embodiment will be described below. In FIG. 5, the component parts of the imaging device including a GPS module are shown with being classified into an imaging device main unit 310, a power supply controller 320, a GPS module 330, and a power supply (battery) 350.

The imaging device main unit 310 has a function as a video camera or still camera, and has an imaging processing function and a reproduction processing function for imaging data.

The imaging device main unit 310 includes a main controller (host CPU) 311, a data storage (flash memory) 312 in which imaging data and so on are recorded, a memory (SDRAM) 314 for temporary data storage, and a display unit (monitor) 313.

The power supply controller 320 is formed of e.g. a front panel system, and includes a front panel controller 321, an input unit 322 including various kinds of switches such as a power supply switch, and an output unit 323 that indicates imaging information and so on. The GPS module 330 includes a GPS device 340 and a supply voltage converter 331. The GPS device 340 is supplied with power arising from conversion into a predetermined voltage by the supply voltage converter 331 so as to be driven. The GPS device 340 executes satellite acquisition processing and navigation message acquisition processing, and includes a data processor 341 that executes navigation data record processing, position calculation processing and so on, and a memory (SRAM) 342 in which acquired navigation data and calculated position data are stored.

The power supply (battery) 350 supplies power to each of the imaging device main unit 310, the power supply controller 320 and the GPS module 330. Note that the supply of power to the GPS module 330 is controlled depending on the state of execution of imaging processing by a user as described later. Furthermore, power for self-refresh processing is supplied to the memory (SDRAM) 314 in the imaging device main unit 310 and the memory (SRAM) 342 in the GPS device 340.

A description will be made below on control of supply of power for driving the GPS device 340. The power for driving the GPS device 340 is input via the supply voltage converter 331 to the GPS device 340. This driving power is controlled based on the state of execution of imaging by a user, measured by the main controller (host CPU) 311 in the imaging device main unit 310.

The main controller (host CPU) 311 in the imaging device main unit 310 measures the frequency of imaging by a user and changes the mode of driving the GPS device 340 depending on the imaging frequency. Specifically, the main controller 311 determines set times as plural control parameters depending on an imaging frequency, and executes state transitions based on the determined set times, although a more detailed description will be made later. These state transitions are e.g. transitions between a GPS normal operation state where power is continuously supplied to the GPS device 340 so that the GPS device 340 executes continuous positioning processing and a GPS intermittent operation state where power is intermittently supplied to the GPS device 340 so that the GPS device 340 executes intermittent positioning processing. The control parameters (set times) as the conditions for such transitions of the GPS module operation state are appropriately updated depending on the frequency of imaging by a user, so that the state transitions are implemented. The state transition processing will be described later in detail with reference to FIG. 6 and subsequent drawings.

To continuously supply power to the GPS device 340, the main controller (host CPU) 311 in the imaging device main unit 310 outputs a control instruction (command) to the front panel controller 321, and the front panel controller 321 controls the supply voltage converter 331 in the GPS module 330 so that power is continuously supplied to the GPS device 340. In the period of the continuous power supply, the GPS device 340 continuously receives navigation messages and executes position calculation processing.

In contrast, to intermittently supply power to the GPS device 340, the main controller (host CPU) 311 in the imaging device main unit 310 stops continuous power supply to the GPS device 340, and outputs a control instruction (command) to the front panel controller 321 so that power is intermittently supplied. The front panel controller 321 controls the supply voltage converter 331 in the GPS module 330 so that power is intermittently supplied to the GPS device 340. In this intermittent power supply period, the GPS device 340 intermittently receives navigation messages and executes position calculation processing.

Specifically, the GPS device 340 independently implements intermittent positioning operation irrespective of the ON/OFF state of the power supply of the imaging device main unit. If an instruction to turn on the power supply of the GPS device 340 is issued from the power supply controller (front panel system) 320, power is supplied from the supply voltage converter 331 to the GPS device and the GPS device 340 starts positioning operation.

A basic processing flow will be described below with reference to the configuration diagram shown in FIG. 5. Initially, when the power supply of the imaging device main unit 310 is turned on due to operation of the input unit 322 in the power supply controller (front panel system) 320 by a user, the GPS device 340 in the GPS module 330 is also powered up, i.e., is supplied with power in response to an instruction from the power supply controller (front panel system) 320.

When the supply of power is started, the GPS device 340 loads therein backup data of navigation data necessary for GPS satellite acquisition from the data storage 312 in the imaging device main unit 310 and utilizes the loaded data for GPS acquisition. Specifically, navigation data, i.e., almanac and ephemeris data, that has been acquired by the GPS device 340 in the past has been stored in the data storage 312 as a nonvolatile memory in the imaging device main unit 310. The GPS device 340 acquires these data to thereby carry out GPS satellite acquisition.

However, the data validity period is defined for the respective navigation data as described above. If the validity period of the data has expired, the GPS device 340 cannot use these already acquired navigation messages and hence needs to carry out GPS satellite acquisition at random.

When the GPS device 340 has successfully acquired GPS satellites necessary for position information calculation, the latest navigation data acquired by the GPS device 340 and the calculated position information are input to the imaging device main unit 310. The controller 311 in the imaging device main unit 310 outputs a command to the power supply controller (front panel system) 320 so that the operation state of the GPS module 330 is switched to the intermittent operation state. In response to the instruction from the power supply controller (front panel system) 320, the state of the GPS module 330 is changed to the intermittent operation state. From then on, the GPS device 340 continues intermittent positioning operation independently of state transitions between the ON/OFF states of the power supply of the imaging device main unit 310.

During the intermittent positioning operation, the latest position information as positioning information based on navigation messages newly acquired by the data processor 341 in the GPS device 340 is stored in the memory (SRAM) 342 in the GPS device 340. When the power supply of the imaging device main unit 310 is turned on next time, the position information stored in the memory (SRAM) 342 in the GPS device 340 is read out by a GPS control application that operates on the imaging device main unit 310.

At the time of the reading-out of the data, the controller 311 determines whether or not the acquired position information and navigation messages are newer than the data held in the data storage 312 as a nonvolatile memory in the imaging device main unit 310. If the acquired information and navigation messages are newer, these newer acquired data are stored in the data storage 312 so that data updating is executed.

Figure 6:
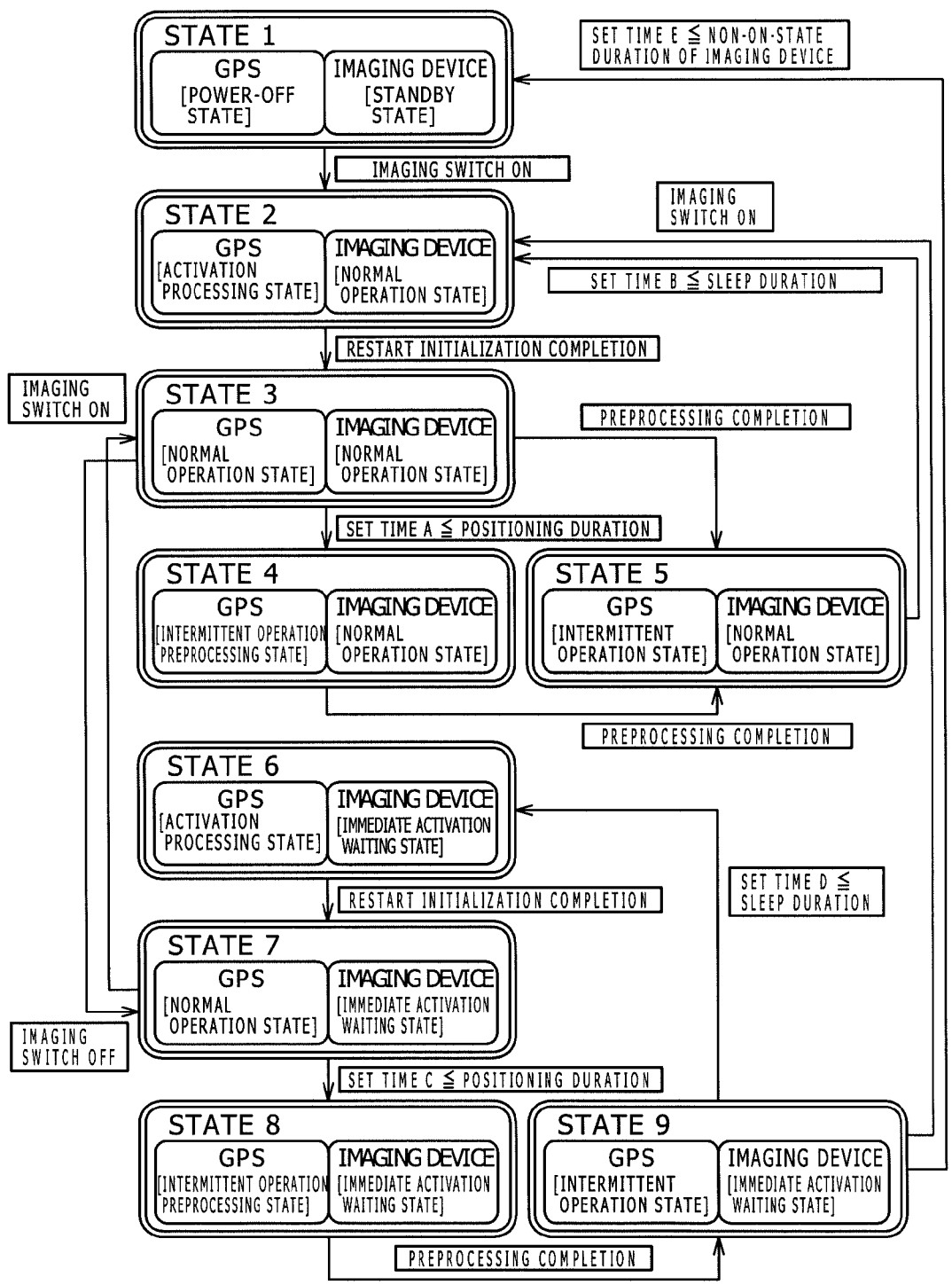
FIG. 6 is a diagram for explaining state transitions in the imaging device of the embodiment.

Referring next to FIG. 6, a description will be made below on state transitions in the imaging device as an information processing device equipped with a GPS. As the state of the imaging device as the information processing device equipped with a GPS according to the embodiment of the invention, there are nine states shown in FIG. 6. These nine states arise from combinations of the state of the GPS part and that of the imaging device part. The operation state of the device is switched among these states. The nine states are as follows:

(State 1) GPS: power-off state, imaging device: standby state;
(State 2) GPS: activation processing state, imaging device: normal operation state;
(State 3) GPS: normal operation state, imaging device: normal operation state;
(State 4) GPS: intermittent operation preprocessing state, imaging device: normal operation state;
(State 5) GPS: intermittent operation state, imaging device: normal operation state;
(State 6) GPS: activation processing state, imaging device: immediate activation waiting state;
(State 7) GPS: normal operation state, imaging device: immediate activation waiting state;
(State 8) GPS: intermittent operation preprocessing state, imaging device: immediate activation waiting state; and
(State 9) GPS: intermittent operation state, imaging device: immediate activation waiting state.

The operation state is switched among these nine states in accordance with various set conditions.

Initially, when the imaging device main unit is powered up by a user in the state where the power supplies of both the imaging device and GPS reception module are in the OFF-state and hence both are completely shutdown, the state is set to State 1. In State 1, the GPS is in the power-off state, and the imaging device is in the standby state.

When imaging, start processing is induced by the user, i.e., an imaging execution switch of the imaging device is turned on by the user, the state is changed to State 2. In State 2, the GPS is in the activation processing state, and the imaging device is in the normal operation state. In State 2, all initialization operations necessary for normal operation are carried out in the imaging device and GPS. In the GPS, processing of receiving data from at least three GPS satellites from which navigation messages can be received to thereby identify the positions of the respective GPS satellites is executed as described above. If valid navigation data that has been received in the past is stored in the memory of the GPS module, initialization processing accompanying satellite acquisition by use of this navigation data is executed.

When the initialization is completed in State 2, the state is switched to State 3. In State 3, the GPS is in the normal operation state, and the imaging device is also in the normal operation state. In this state, the imaging device is in the imaging execution mode while the GPS reception module is in the mode to continuously execute positioning operation. Specifically, power is continuously supplied to the GPS module, so that the positioning processing is continuously carried out.

When the imaging device is in the normal operation state (States 2 to 5) or in the immediate activation waiting state (States 6 to 9), the frequency of imaging by a user is measured by the main controller (host CPU) 311 in the imaging device main unit 310, described with reference to FIG. 5. Based on the measured imaging frequency, the main controller (host CPU) 311 in the imaging device main unit 310 determines or updates control parameters A to E as the conditions for transitions to the respective states shown in FIG. 6. The control parameters A to E are the threshold times as the following transition conditions:

control parameter A=set time A as the transition condition from State 3 to State 4;

control parameter B=set time B as the transition condition from State 5 to State 2;

control parameter C=set time C as the transition condition from State 7 to State 8;

control parameter D=set time D as the transition condition from State 9 to State 6; and control parameter E=set time E as the transition condition from State 9 to State 1.

More specifically, the control parameters A to E are equivalent to the following set values:

control parameter A (set time A)=the maximum duration of normal positioning operation of the GPS when the imaging device is in the normal operation state;

control parameter B (set time B)=the maximum duration of intermittent positioning operation (sleep state) of the GPS when the imaging device is in the normal operation state;

control parameter C (set time C)=the maximum duration of normal positioning operation of the GPS when the imaging device is in the immediate activation waiting state;

control parameter D (set time D)=the maximum duration of intermittent positioning operation (sleep state) of the GPS when the imaging device is in the immediate activation waiting state; and control parameter E (set time E)=the maximum duration of the immediate activation waiting state of the imaging device.

When determining these control parameters, the main controller (host CPU) 311 in the imaging device main unit 310 executes the following parameter setting processing basically. Specifically, when the frequency of imaging by the imaging part is at a high level, long periods are set as the maximum durations of the normal operation state of the GPS (parameters A and C), where power is continuously supplied to the GPS device so that the GPS device executes continuous positioning processing. Furthermore, short periods are set as the maximum durations of the intermittent operation state of the GPS (parameters B and D), where power is intermittently supplied to the GPS device so that the GPS device executes intermittent positioning processing. The main controller 311 executes processing of determining or updating control parameters in this manner.

In contrast, when the frequency of imaging by the imaging part is at a low level, short periods are set as the maximum durations of the normal operation state of the GPS (parameters A and C), where power is continuously supplied to the GPS device so that the GPS device executes continuous positioning processing. Furthermore, long periods are set as the maximum durations of the intermittent operation state of the GPS (parameters B and D), where power is intermittently supplied to the GPS device so that the GPS device executes intermittent positioning processing. The main controller 311 executes processing of determining or updating control parameters in this manner.

Basically, the above-described parameter setting is carried out.

In the determining or updating processing for these control parameters, all the parameters A to E may be determined or updated when the imaging device is in the normal operation state (States 2 to 5) or in the immediate activation waiting state (States 6 to 9). Furthermore, the following setting way is also available. Specifically, when the imaging device is in the normal operation state (States 2 to 5), only the control parameters A and B, which relate to the normal operation state, are determined or updated. When the imaging device is in the immediate activation waiting state (States 6 to 9), only the control parameters C and D, which relate to the immediate activation waiting state, are determined or updated. As for the control parameter E, a fixed value is used.

Alternatively, another processing configuration may be employed in which the control parameters A and B are determined or updated when the device is in State 3 shown in FIG. 6 and the control parameters C and D are determined or updated when the device is in State 7 shown in FIG. 6.

These control parameters A to E are determined depending on an imaging frequency level [L] that is obtained based on the frequency [m] of imaging by a user, measured by the main controller (host CPU) 311 in the imaging device main unit 310 for example. As the imaging frequency [m], e.g. the following values are measured by the main controller (host CPU) 311 in the imaging device main unit 310. Specifically, in capturing of still images, the number of captured still images per unit time [m=(the number of captured images)/(unit time (e.g., 30 minutes))] is measured. In capturing of moving images, the imaging time per unit time [m=(imaging execution time)/(unit time (e.g., 30 minutes))] or the number of captured frames per unit time [m=(the number of captured frames)/(unit time (e.g., 30 minutes))] is measured.

A description will be made below with reference to FIG. 7 on the relationship among the frequency [m] of imaging by a user, the imaging frequency level [L], and the control parameters A to E defined depending on the imaging frequency level [L]. FIG. 7 shows an example in which three imaging frequency levels [L1] to [L3] are defined for the frequency [m] of imaging by a user and the control parameters A to E are set to different values depending on the imaging frequency levels [L1] to [L3].

For example, the frequency [m] of imaging by a user is classified based on predefined imaging frequency thresholds m0 to m2, so that the imaging frequency level [L] corresponding to the measured imaging frequency [m] is obtained by using the following settings:

$m0 \leq m < m1$: imaging frequency level [L1];
$m1 \leq m < m2$: imaging frequency level [L2]; and
$m2 \leq m$: imaging frequency level [L3].

In this manner, the imaging frequency level [Ln] is determined depending on the frequency [m] of imaging by a user. Note that this level setting way is merely one example. The number of set levels may be larger.

Upon the determination of the imaging frequency level [Ln], the control parameters A to E as the conditions for transitions to the respective states shown in FIG. 6 are determined in accordance with the table shown in FIG. 7. Symbols a1 to e1, a2 to e2, and a3 to e3 shown in the table of FIG. 7 indicate the set values of the control parameters A to E as the conditions for transitions to the respective states shown in FIG. 6, i.e., the set times A to E as threshold times, corresponding to the respective imaging frequency levels [Ln].

For example, the time setting is implemented in the following manner. As the control parameters defined for the lowest imaging frequency level L1, a1 is set to two minutes, b1 is set to five minutes, and so on. As the control parameters defined for the middle imaging frequency level L2, a2 is set to two minutes, b2 is set to three minutes, and so on. As the control parameters defined for the highest imaging frequency level L3, a3 is set to the infinite, b3 is set to zero minute, and so on.

Figure 8:
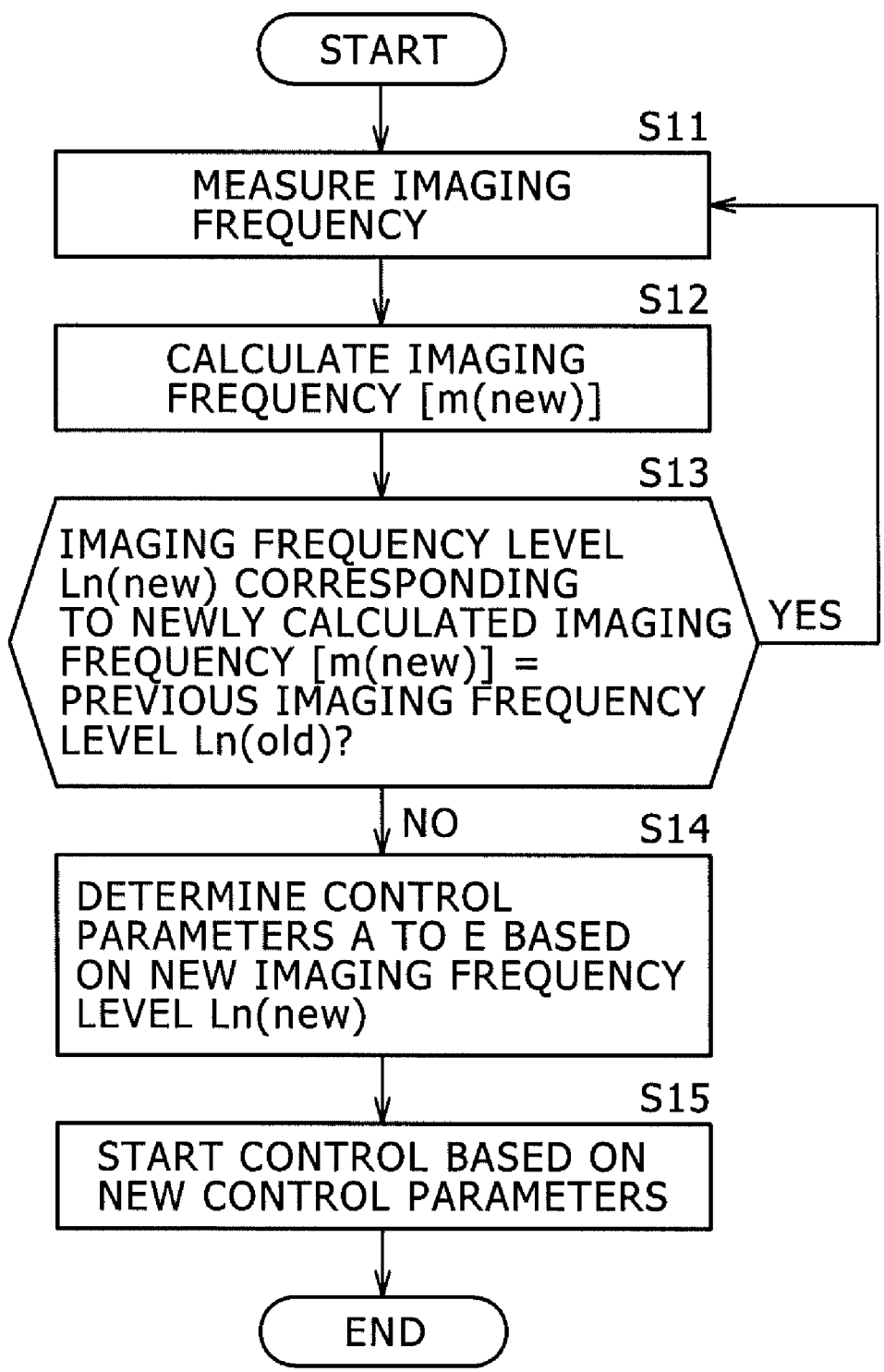
FIG. 8 is a diagram showing a flowchart for explaining the sequence of processing of updating the control parameters used for the state transitions in the imaging device of the embodiment.

A description will be made below with reference to the flowchart shown in FIG. 8 on the sequence of control parameter updating processing executed by the main controller (host CPU) 311 in the imaging device main unit 310 shown in FIG. 5. As described above, this control parameter updating processing is executed when the imaging device is in the normal operation state (States 2 to 5 shown in FIG. 6) or in the immediate activation waiting state (States 6 to 9).

Initially, the imaging frequency is measured in a step S11, followed by calculation of the imaging frequency [m(new)] in a step S12. By the processing of the step S12, e.g. the following values are calculated as the imaging frequency as described above. Specifically, in capturing of still images, the number of captured still images per unit time [m=(the number of captured images)/(unit time (e.g., 30 minutes))] is measured. In capturing of moving images, the imaging time per unit time [m=(imaging execution time)/(unit time (e.g., 30 minutes))] or the number of captured frames per unit time [m=(the number of captured frames)/(unit time (e.g., 30 minutes))] is measured. The imaging frequency calculation is repeatedly executed every predetermined time. In the flowchart, the latest measured value is indicated as the imaging frequency [m(new)], and the previous (one-time-before) measured value is indicated as the imaging frequency [m(old)].

In a step S13, it is determined whether or not the imaging frequency level Ln(new) corresponding to the newly calculated imaging frequency [m(new)] is equal to the imaging frequency level Ln(old) corresponding to the previously measured imaging frequency [m(old)]. If they are equal, the parameters A to E are not updated, and the processing sequence returns to the step S11, followed by the next measurement. Although not shown in the flowchart, setting of the parameters is carried out if the parameters have not been set yet.

If it is determined in the step S13 that the imaging frequency level Ln(new) corresponding to the newly calculated imaging frequency [m(new)] is different from the imaging frequency level Ln(old) corresponding to the previously measured imaging frequency [m(old)], updating of the set parameters is implemented. Specifically, the processing sequence proceeds to a step S14, where the control parameters A to E are determined based on the new imaging frequency level Ln(new). In this processing, by using e.g. the table shown in FIG. 7, the set values associated with the imaging frequency level Ln(new) corresponding to the newly calculated imaging frequency [m(new)] are used as the new control parameters A to E. In a step S15, control based on these newly set parameters is carried out.

In the above-described manner, the main controller (host CPU) 311 in the imaging device main unit 310 shown in FIG. 5 measures the frequency of imaging by a user and updates the set times for the respective state transitions shown in FIG. 6.

Referring back to FIG. 6, the description on the state transitions of the imaging device and GPS will be resumed. The state transitions depend on the control parameters A to E as the set times that are the conditions for the respective state transitions shown in FIG. 6 and are determined based on the frequency [m] of imaging by the imaging device.

For the transitions among States 2 to 5, where the imaging device is in the normal operation state, the control parameters A and B are applied.

As described above, State 3 is the state where the GPS is in the normal operation state and the imaging device is also in the normal operation state. In this state, the imaging device is in the imaging execution mode while the GPS reception module is in the mode to continuously execute positioning operation. Specifically, power is continuously supplied to the GPS module, so that the positioning processing is continuously carried out.

The duration of State 3 is measured by a timer in the main controller (host CPU) 311 of the imaging device main unit 310 shown in FIG. 5. The controller 311 compares the timer count value with the predefined set time A (the maximum duration of normal positioning operation by the GPS). If the timer count is equal to or larger than the set time A, state transition from State 3 to State 4 occurs. In State 4, the GPS is in the intermittent operation preprocessing state, while the imaging device is in the normal operation state.

Thereafter, when the intermittent operation preprocessing of the GPS is completed, state transition from State 4 to State 5 occurs. In State 5, the GPS is in the intermittent operation state, while the imaging device is in the normal operation state. Specifically, in State 5, the GPS reception module is in the intermittent operation state (sleep state). Thus, the GPS reception module executes intermittent positioning with a decreased frequency of the positioning processing compared with the normal positioning operation, and therefore executes low-power-consumption positioning.

To cause the GPS reception module to enter the intermittent operation state (sleep state), as described above with reference to FIG. 5, the main controller (host CPU) 311 in the imaging device main unit 310 outputs a control instruction (command) to the front panel controller 321 so that continuous power supply to the GPS device 340 is stopped and intermittent power supply thereto is implemented. The front panel controller 321 controls the supply voltage converter 331 in the GPS module 330 so that power is intermittently supplied to the GPS device 340. In this intermittent power supply period, the GPS device 340 intermittently receives navigation messages and executes position calculation processing.

Specifically, the GPS device 340 independently implements intermittent positioning operation irrespective of the ON/OFF state of the power supply of the imaging device main unit. If an instruction to turn on the power supply of the GPS device 340 is issued from the power supply controller (front panel system) 320, power is supplied from the supply voltage converter 331 to the GPS device and the GPS device 340 starts positioning operation. The power consumed by the GPS module in this intermittent positioning processing is greatly lower than that in the execution period of normal positioning processing.

In the execution period of State 5 shown in FIG. 6, the duration of State 5 is measured by the timer in the main controller (host CPU) 311 of the imaging device main unit 310 shown in FIG. 5. The controller 311 compares the timer count value with the predefined set time B (the maximum duration of intermittent positioning operation (sleep state) by the GPS). If the timer count is equal to or larger than the set time B, state transition from State 5 to State 2 occurs. In State 2, the GPS is in the activation processing state, while the imaging device is in the normal operation state.

From then on, until a user turns off the power supply of the imaging device main unit, state transitions are repeated in the order of State 2→State 3→State 4→State 5→State 2.

The relationship among States 6 to 9 shown in FIG. 6 indicates state transitions when the imaging device is in the immediate activation waiting state. For example, when a user turns off the power supply of the imaging device in State 3, state transition from State 3 to State 7 occurs. In State 7, the GPS is in the normal operation state, and the imaging device is in the immediate activation waiting state. Specifically, the imaging device is in the state where it can be immediately activated in response to the next power-on operation by a user, and the GPS reception module is in the state to continue positioning processing based on normal operation.

In this state, it appears to a user that the imaging device is shutdown. In contrast, the GPS reception module normally continues positioning processing and executes processing of updating the latest positioning data and navigation data.

The state transitions when the'imaging device is in the immediate activation waiting state, i.e., the state transitions of State 6→7→8→9, have correspondence with those when it is in the normal operation state, i.e., the state transitions of State 2→3→4→5. However, there is the difference therebetween in that the employed set times as the control parameters are as follows. Specifically, when the imaging device is in the normal operation state, the set times A and B are employed. In contrast, when the imaging device is in the immediate activation waiting state, the set times C and D are employed.

For the transitions among States 6 to 9, where the imaging device is in the immediate activation waiting state, the control parameters C and D are applied.

In State 7, the GPS is in the normal operation state, and the imaging device is in the immediate activation waiting state. In this state, the imaging device is in the immediate activation waiting state while the GPS reception module is in the mode to continuously execute positioning operation. Specifically, power is continuously supplied to the GPS module, so that the positioning processing is continuously carried out.

The duration of State 7 is measured by the timer in the main controller (host CPU) 311 of the imaging device main unit 310 shown in FIG. 5. The controller 311 compares the timer count value with the predefined set time C (the maximum duration of normal positioning operation by the GPS). If the timer count is equal to or larger than the set time C, state transition from State 7 to State 8 occurs. In State 8, the GPS is in the intermittent operation preprocessing state, while the imaging device is in the immediate activation waiting state.

Thereafter, when the intermittent operation preprocessing of the GPS is completed, state transition from State 8 to State 9 occurs. In State 9, the GPS is in the intermittent operation state, while the imaging device is in the immediate activation waiting state. Specifically, in State 9, the GPS reception module is in the intermittent operation state (sleep state). Thus, the GPS reception module executes intermittent positioning with a decreased frequency of the positioning processing compared with the normal positioning operation, and therefore executes low-power-consumption positioning.

To cause the GPS reception module to enter the intermittent operation state (sleep state), as described above with reference to FIG. 5, the main controller (host CPU) 311 in the imaging device main unit 310 outputs a control instruction (command) to the front panel controller 321 so that continuous power supply to the GPS device 340 is stopped and intermittent power supply thereto is implemented. The front panel controller 321 controls the supply voltage converter 331 in the GPS module 330 so that power is intermittently supplied to the GPS device 340. In this intermittent power supply period, the GPS device 340 intermittently receives navigation messages and executes position calculation processing.

Specifically, the GPS device 340 independently implements intermittent positioning operation irrespective of the ON/OFF state of the power supply of the imaging device main unit. If an instruction to turn on the power supply of the GPS device 340 is issued from the power supply controller (front panel system) 320, power is supplied from the supply voltage converter 331 to the GPS device and the GPS device 340 starts positioning operation. The power consumed by the GPS module in this intermittent positioning processing is greatly lower than that in the execution period of normal positioning processing.

In the execution period of State 9 shown in FIG. 6, the duration of State 9 is measured by the timer in the main controller (host CPU) 311 of the imaging device main unit 310 shown in FIG. 5. The controller 311 compares the timer count value with the predefined set time D (the maximum duration of intermittent positioning operation (sleep state) by the GPS). If the timer count is equal to or larger than the set time D, state transition from State 9 to State 6 occurs. In State 6, the GPS is in the activation processing state, while the imaging device is in the immediate activation waiting state.

From then on, until a user turns off the power supply to the imaging device main unit or until the duration of State 9 becomes equal to or longer than the set time E, state transitions are repeated in the order of State 6→State 7→State 8→State 9→State 6. The transitions among States 6 to 9 are almost similar to those among States 2 to 5. Main differences therebetween are that the state of the imaging device is different, and that the values of the control parameters are different, i.e., the values of the set times A and B and those of the set times C and D are different from each other.

In any of States 6 to 9, i.e., when the imaging device is in the immediate activation waiting state, the timer in the main controller (host CPU) 311 of the imaging device main unit 310 shown in FIG. 5 measures the duration of the immediate activation waiting state of the imaging device. The controller 311 compares the timer count with the predefined control parameter E (set time E, i.e., the maximum duration of the immediate activation waiting state of the imaging device). If the timer count is equal to or larger than the value of the set time E, state transition from State 9 to State 1 occurs. In State 1, the GPS is in the power-off state, while the imaging device is in the standby state. This transition processing is oriented for e.g. the case where a user packs up the imaging device itself into a keeping case after finishing all imaging acts of a day. Thereafter, when the imaging device is powered on again, the above-described control state transition of State 1→State 2 is repeated.

Figure 9:
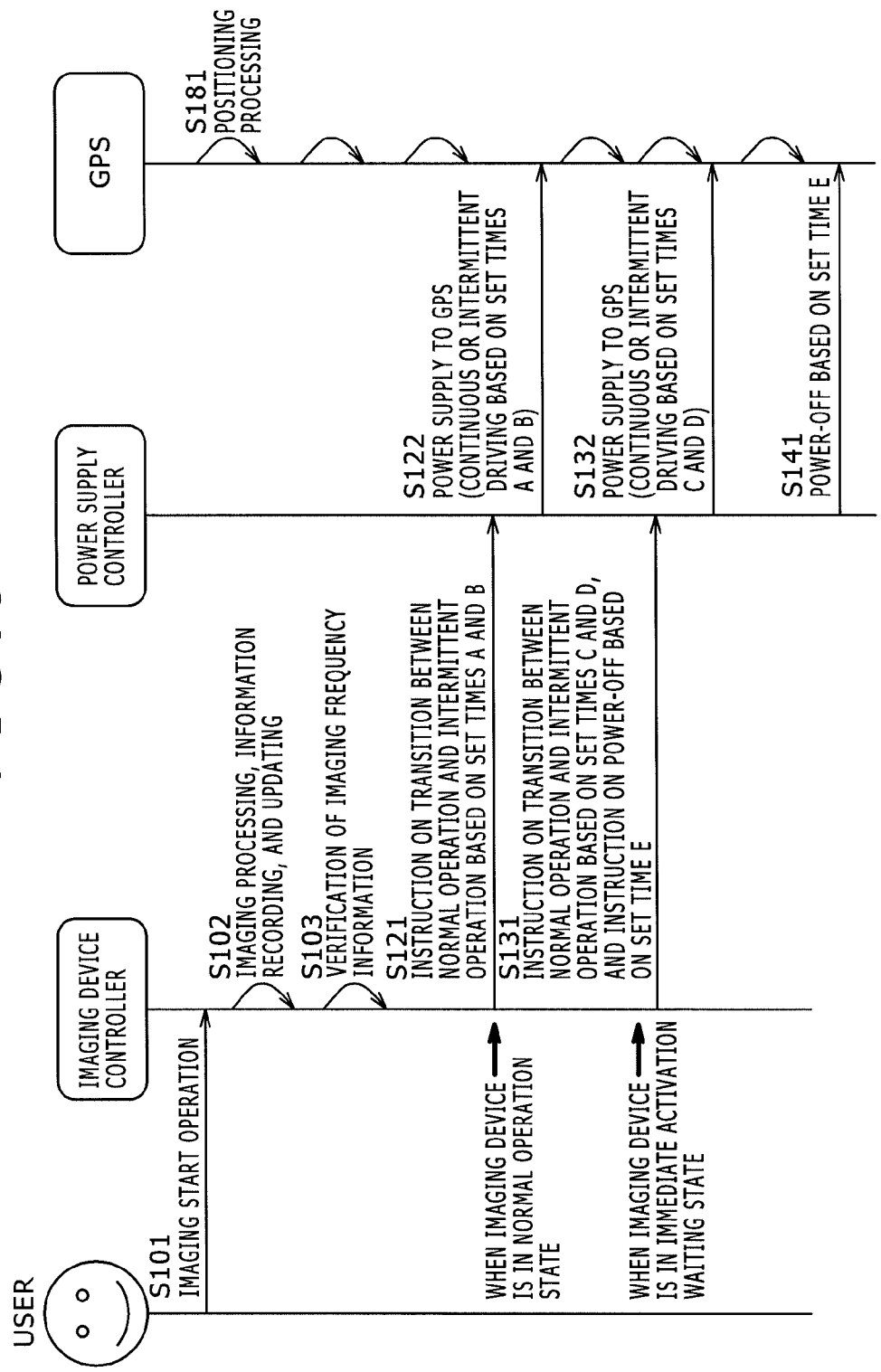
FIG. 9 is a diagram for explaining the sequence of communication among the respective component parts at the time of execution of data processing in the imaging device of the embodiment.

FIG. 9 is a sequence diagram showing in a simplified manner the sequence of communication of commands and data among a user, the imaging device controller, the power supply controller, and the GPS module, carried out in the state transition processing described with reference to FIG. 6.

When a user starts imaging, i.e., a user turns on the switch of the imaging device in a step S101, the imaging device controller executes imaging processing, information recording, and updating processing in response to the user's operation in a step S102, and measures an imaging frequency in a step S103. At this time, power is continuously supplied from the power supply controller to the GPS, so that positioning processing in the normal operation state is started in a step S181. This state is equivalent to State 3 shown in FIG. 6.

The instructions issued in a step S121 shown in FIG. 9 are equivalent to commands from the imaging device controller to the power supply controller for the state transitions shown in FIG. 6 when the imaging device is in the normal operation state, i.e., the state transitions of State 2→3→4→5. As described above with reference to FIG. 6, when the imaging device is in the normal operation state, the following two parameters A and B are determined:

> control parameter A (set time A)=the maximum duration of normal positioning operation of the GPS when the imaging device is in the normal operation state; and
>
> control parameter B (set time B)=the maximum duration of intermittent positioning operation (sleep state) of the GPS when the imaging device is in the normal operation state.

More specifically, these parameters are determined by the imaging device controller in accordance with the imaging frequency level [Ln] corresponding to the imaging frequency [m].

Based on these parameters A and B, the imaging device controller outputs commands to the power supply controller so that the transitions of State 2→3→4→5 described with reference to FIG. 6 are implemented. Thus, in a step S122, the power supply controller controls power supply to the GPS in accordance with the commands. As a result, the GPS executes positioning processing with properly switching its drive mode between the continuous drive mode and intermittent drive mode.

The instructions issued in a step S131 shown in FIG. 9 are equivalent to commands from the imaging device controller to the power supply controller for the state transitions shown in FIG. 6 when the imaging device is in the immediate activation waiting state, i.e., the state transitions of State 6→7→8→9. As described above with reference to FIG. 6, when the imaging device is in the immediate activation waiting state, the following two parameters C and D are determined:

> control parameter C (set time C)=the maximum duration of normal positioning operation of the GPS when the imaging device is in the immediate activation waiting state; and
>
> control parameter D (set time D)=the maximum duration of intermittent positioning operation (sleep state) of the GPS when the imaging device is in the immediate activation waiting state.

More specifically, these parameters are determined by the imaging device controller in accordance with the imaging frequency level [Ln] corresponding to the imaging frequency [m].

Based on these parameters C and D, the imaging device controller outputs commands to the power supply controller so that the transitions of State 6→7→8→9 described with reference to FIG. 6 are implemented. Thus, in a step S132, the power supply controller controls power supply to the GPS in accordance with the commands. As a result, the GPS executes positioning processing with properly switching its drive mode between the continuous drive mode and intermittent drive mode.

Furthermore, when the imaging device is in the immediate activation waiting state, the imaging device controller measures the duration of the immediate activation waiting state, and compares the timer count with the following predefined parameter E:

> control parameter E (set time E)=the maximum duration of the immediate activation waiting state of the imaging device.

If it is determined that the timer count has become equal to or larger than the parameter E as a result of the comparison therebetween, the imaging device controller commands the power supply controller to turn off the power supply to the GPS. Thus, in a step S141, the power supply controller stops the power supply to the GPS. This operation is equivalent to the transition from State 9 to State 1 described above with reference to FIG. 6.

In the above-described manner, the information processing device (imaging device) of an embodiment of the invention monitors the state of use by a user, i.e., the frequency of imaging with the imaging device, and calculates a use frequency per unit time. Subsequently, the information processing device updates the set times as the following control parameters used as the conditions for state transitions:

> control parameter A (set time A)=the maximum duration of normal positioning operation of the GPS when the imaging device is in the normal operation state;

> control parameter B (set time B)=the maximum duration of intermittent positioning operation (sleep state) of the GPS when the imaging device is in the normal operation state;

> control parameter C (set time C)=the maximum duration of normal positioning operation of the GPS when the imaging device is in the immediate activation waiting state;

> control parameter D (set time D)=the maximum duration of intermittent positioning operation (sleep state) of the GPS when the imaging device is in the immediate activation waiting state; and > control parameter E (set time E)=the maximum duration of the immediate activation waiting state of the imaging device.

The information processing device induces state transitions based on the updated parameters to thereby cause the GPS module to be intermittently driven. Due to this configuration, unnecessary power consumption in the GPS device is prevented, which suppresses exhaustion of a battery. Furthermore, the intermittent driving of the GPS device makes it possible to maintain navigation messages, which are data received from GPS satellites, as ones within the validity period. Therefore, position calculation in a short period by use of the navigation messages is allowed without a new search for GPS satellites.

A description will be made below regarding the amount of power consumption in a GPS device with reference to FIGS. 10 and 11. FIG. 10 shows the transition of the amount of power consumption in a GPS device when navigation messages are continuously acquired after turning-on of the power supply of the GPS device and execution of GPS satellite acquisition. Plotted on the abscissa and ordinate are the time t (sec) and the current amount (mA) corresponding to the amount of power consumption in the GPS device, respectively.

At time t0, power supply to the GPS device is started. This example is based on an assumption that at this timing (t0), already acquired navigation messages have expired and thus cannot be used. In this case, the GPS device executes processing of acquiring plural GPS satellites necessary for position measurement. Specifically, the GPS device searches plural GPS satellites and receives navigation messages from GPS satellites found as a result of the search. For this processing, a current of about 70 mA is consumed.

Subsequently, if the GPS device successfully acquires GPS satellites and navigation messages within the validity period are recorded in a memory at time (t1), there is no need to search new GPS satellites from then on, and hence the mode of the GPS device can be switched to the tracking mode to follow the acquired GPS satellites. In this tracking mode, the GPS device is allowed to track the GPS satellites by using the navigation messages within the validity period, and the consumption current is decreased to about 30 mA. When the GPS device continuously receives navigation messages, it is requisite that a current of 30 mA is continuously supplied to the GPS device.

FIG. 11 shows an example in which power is supplied to a GPS device in the intermittent mode. FIG. 11A indicates the timing at which an application on the imaging device main unit side acquires position information from the GPS module. When being in the ON-state, the imaging device acquires position information from the GPS module. FIG. 11B indicates the transitions of the ON/OFF states of the power supply of the GPS device. In this example, the GPS device is in the intermittent mode, and the ON and OFF states thereof are switched in accordance with the predefined control timings of the intermittent mode. FIG. 11C shows the transition of the amount of power consumption in the GPS module.

At time (ta), power supply to the GPS device is started. This example is based on an assumption that at this timing (ta), similarly to the time (t0) of FIG. 10, already acquired navigation messages have expired and thus cannot be used. In this case, the GPS device executes processing of acquiring plural GPS satellites necessary for position measurement. Specifically, the GPS device searches plural GPS satellites and receives navigation messages from GPS satellites found as a result of the search. For this processing, a current of about 70 mA is consumed.

Subsequently, if the GPS device successfully acquires GPS satellites and navigation messages within the validity period are recorded in a memory at time (tb), there is no need to search new GPS satellites from then on, and hence the mode of the GPS device can be switched to the tracking mode to follow the acquired GPS satellites. In this tracking mode, the GPS device is allowed to track the GPS satellites by using the navigation messages within the validity period, and the consumption current is decreased to about 30 mA.

If it is determined at time (tc) that the frequency of imaging by a user is lower than a predefined threshold value through monitoring processing by the application on the imaging device side, the mode of power supply to the GPS device is set to the intermittent mode, so that the power supply to the GPS device is stopped temporarily. Thereafter, at time td, which is the timing when the application issues a position information acquisition request to the GPS device, power supply to the GPS device is resumed, and thus power consumption in the GPS device arises at this timing.

However, unless the period during which power supply to the GPS device is stopped becomes a long period, already acquired navigation messages are kept as ones within the validity period. Thus, GPS satellite tracking by use of the navigation messages within the validity period can be implemented without a new search for GPS satellites. That is, navigation message reception in the tracking mode is allowed, which permits processing with low power consumption. If in the period from the time (td) to (te), new navigation messages are successfully acquired, so that the navigation messages are stored in a memory and calculated position information is provided to the application, power supply to the GPS device is stopped, which makes power consumption zero. Due to the execution of processing in such an intermittent mode, power consumption is reduced. In addition, unless the period during which power supply to the GPS device is stopped becomes a long period, already acquired navigation messages are kept as ones within the validity period. Thus, new navigation messages can be acquired from GPS satellites in a short period by using the navigation messages within the validity period.

The timing of resumption of power supply to the GPS device (e.g., the time (td) in FIG. 11) can be set to any of various timings. In the example shown in FIG. 11, the timing of resumption of power supply to the GPS device is matched to the timing when position information is input to the imaging device main unit from the GPS device. However, the interval of turning ON/OFF of power supply to the GPS device in this intermittent control can be optionally set to any interval. For example, such setting that turning ON and OFF are repeated with a predefined constant interval is also available. In addition, the maximum duration of power-OFF of the GPS device may be set to a period shorter than the validity period of navigation messages. Such setting can typically maintain the state where navigation messages within the validity period can be used.

As the configuration to determine the set times of intermittent operation of the GPS reception module, a configuration is available that is equipped with an optimization learning algorithm and optimally controls the intervals based on the learning algorithm. As a configuration to realize the control most easily, e.g. a control configuration is possible in which imaging frequencies and set time values as fixed values associated with each other based on basic experimental data are stored in a memory of the system and the system issues instructions based on the stored data. However, independent driving of a GPS reception module appropriate to various use cases can be achieved by optimizing the correlation between the imaging frequencies and set time values and so on with use of a learning algorithm depending on the state of imaging by a user, and implementing control based on the optimized data.

Although the above-described embodiment employs a configuration in which the set times A to E as control parameters are determined by the imaging device, another configuration is also available in which imaging frequency information is provided to the power supply controller and the power supply controller determines the control parameters A to E.

Furthermore, in the description of the embodiment, a configuration example in which a GPS module is included in the imaging device has been explained. However, another configuration in which a GPS system is externally attached to the imaging device through USB connection or the like is also available as long as a power supply is shared by both the device main unit and GPS module. This configuration achieves a power reduction effect and more rapid position information acquisition processing.

In addition, in the description of the embodiment, a configuration example in which a power supply is shared by the GPS module and imaging device main unit has been explained. However, also in a configuration in which a power supply is separately provided for each of them, an effect of suppressing power consumption in the GPS module can be achieved. Moreover, the restart speed can be enhanced, which achieves more rapid position information acquisition processing.

Furthermore, although the above-described embodiment is applied to an imaging device, embodiments of the invention can be applied also to other various GPS-equipped products such as various information processing devices typified by car navigation systems, handy GPSs, portable personal computers, cell phones, and so on.

The present invention has been described in detail above with reference to a specific embodiment of the invention. It should be apparent that various modifications and substitutions might be incorporated into the embodiment by those skilled in the art without departing from the scope and spirit of the invention. That is, the embodiment of the invention has been disclosed merely for the purpose of exemplification, and should not be interpreted as a limitation to the scope of the invention. The appended claims should be consulted to determine the gist of the invention.

The series of processing described in the specification can be executed by hardware, software, or a complex configuration therebetween. If the processing is executed by software, a program in which the processing sequence is recorded can be installed for execution into a memory included in a computer and integrated in dedicated hardware. Alternatively, the program can be installed for execution into a general-purpose computer capable of executing various kinds of processing.

For example, the program can be recorded in a hard disc or read only memory (ROM) as a recording medium in advance. Alternatively, the program can be temporarily or permanently stored (recorded) in a removable recording medium such as a flexible disc, a compact disc read only memory (CD-ROM), a magneto optical (MO) disc, a digital versatile disc (DVD), a magnetic disc, or a semiconductor memory. Such a removable recording medium can be provided as so-called package software.

Instead of installing the program from a removable recording medium to a computer in the above-described manner, the program may be transferred to a computer from a download site via wireless connection or a wired network such as a local area network (LAN) or the Internet, so that the computer can receive the thus transferred program and can install it in a recording medium such as its built-in hard disc.

The various kinds of processing described in the specification may not only be executed time-sequentially in accordance with the description, but may also be executed in parallel or individually depending on the processing ability of the device to execute the processing or according to need. Furthermore, the term "system" in the present specification refers to a logical assembly entity of plural devices, and is not limited to an entity in which devices with the respective configurations are included in the same casing.

As described above, according to one embodiment of the present invention, in an imaging device such as a video camera or still camera including a global positioning system (GPS) device, the frequency of imaging by a user is measured, so that control parameters as the conditions for transitions of the operation state of the GPS device are determined or updated based on the measured imaging frequency. Furthermore, based on the determined or updated control parameters, state transitions of the GPS device are implemented. For example, when the use frequency is at a low level, the parameters are updated so that the intermittent operation period during which power is intermittently supplied to the GPS device is set to a long period. Thus, unnecessary power consumption in the GPS device is prevented, which realizes an imaging device in which exhaustion of a battery is suppressed.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging device, comprising:
   an imaging unit configured to execute processing to capture image data;
   a position calculating device configured to execute position calculation processing based on data received; and
   a main controller configured to measure an imaging frequency of the imaging unit by counting a number of captured images over a predetermined period of time, to determine or update a control parameter as a condition for a transition of an operation state of the position calculating device based on the measured imaging frequency, and to cause a transition of the operation state of the position calculating device based on the determined or updated control parameter.

2. The imaging device according to claim 1, wherein to cause the transition of the operation state of the position calculating device in accordance with the control parameter, the main controller is configured to output a command to a power supply controller that controls power supply to the position calculating device so that power is continuously or intermittently supplied to the position calculating device, depending on an intended operation state of the position calculating device.

3. The imaging device according to claim 1, wherein the main controller is configured to determine or update, based on the imaging frequency, a maximum duration of a normal operation state and a maximum duration of an intermittent operation state as the determined or updated control parameter, and to cause a transition of the operation state of the position calculating device based on the determined or updated control parameter, wherein in the normal operation state power is continuously supplied to the position calculating device and the position calculating device executes continuous position calculation processing, and wherein in the intermittent operation state power is intermittently supplied to the position calculating device and the position calculating device executes intermittent position calculation processing.

4. The imaging device according to claim 1, wherein the main controller is configured to obtain an imaging frequency level associated with a data range of the imaging frequency, to determine or update the control parameter based on the imaging frequency level, and to cause a transition of the operation state of the position calculating device based on the determined or updated control parameter.

5. The imaging device according to claim 1, wherein the main controller executes processing to determine or update the control parameter while differentiating a control parameter for a state in which the imaging unit is in a normal operation state from a control parameter for a state in which the imaging unit is in an activation waiting state, and causes a transition of the operation state of the position calculating device based on the determined or updated control parameter.

6. The imaging device according to claim 1, wherein the main controller is configured to determine or update a maximum duration of a state in which the imaging unit is in an activation waiting state as the determined or updated control parameter, and to cause a transition of the operation state of the position calculating device based on the determined or updated control parameter.

7. An imaging device, comprising:
   an imaging unit configured to execute processing to capture image data;
   a position calculating device configured to execute position calculation processing based on data received; and
   a main controller configured to measure an imaging frequency of the imaging unit, to determine or update a control parameter as a condition for a transition of an operation state of the position calculating device based on the measured imaging frequency, and to cause a transition of the operation state of the position calculating device based on the determined or updated control parameter,
   when the imaging frequency of the imaging unit is at a high level, the main controller is configured to execute processing to determine or update the control parameter so that a maximum duration of a normal operation state is set to a long period and a maximum duration of an intermittent operation state is set to a short period, wherein in the normal operation state power is continuously supplied to the position calculating device and the position calculating device executes continuous position calculation processing, and wherein in the intermittent operation state power is intermittently supplied to the position calculating device and the position calculating device executes intermittent position calculation processing, and
   when the imaging frequency of the imaging unit is at a low level, the main controller is configured to execute processing to determine or update the control parameter so that the maximum duration of the normal operation state is set to a short period and the maximum duration of the intermittent operation state is set to a long period.

8. A position calculating control method in an imaging device including a position calculating device, the method comprising:
   measuring an imaging frequency of an imaging unit that executes processing to capture image data by counting a plurality of captured images over a predetermined period of time;
   determining or updating a control parameter as a condition for a transition of an operation state of the position calculating device based on the measured imaging frequency; and
   causing a transition of the operation state of the position calculating device based on the determined or updated control parameter.

9. The position calculating control method according to claim 8, wherein the transition causing step includes outputting a command to a power supply controller that controls power supply to the position calculating device so that power is continuously or intermittently supplied to the position calculating device, depending on an intended operation state of the position calculating device.

10. The position calculating control method according to claim 8, wherein the determining or updating step includes determining or updating, based on the imaging frequency, a maximum duration of a normal operation state and a maximum duration of an intermittent operation state as the determined or updated control parameter, wherein in the normal operation state power is continuously supplied to the position calculating device and the position calculating device executes continuous position calculation processing, and wherein in the intermittent operation state power is intermittently supplied to the position calculating device and the position calculating device executes intermittent position calculation processing.

11. The position calculating control method according to claim 8, wherein the determining or updating step includes obtaining an imaging frequency level associated with a data range of the imaging frequency, and determining or updating the control parameter based on the imaging frequency level.

12. The position calculating control method according to claim 8, wherein the determining or updating step includes executing processing to determine or update the control parameter while differentiating between a control parameter for a state in which the imaging unit is in a normal operation state and a control parameter for a state in which the imaging unit is in an activation waiting state.

13. The position calculating control method according to claim 8, wherein the determining or updating step includes determining or updating a maximum duration of a state in which the imaging unit is in an activation waiting state as the determined or updated control parameter.

14. A position calculating control method in an imaging device including a position calculating device, the method comprising:
   measuring an imaging frequency of an imaging unit that executes processing to capture image data;
   determining or updating a control parameter as a condition for a transition of an operation state of the position calculating device based on the measured imaging frequency; and
   causing a transition of the operation state of the position calculating device based on the determined or updated control parameter, when the imaging frequency of the imaging unit is at a high level, the determining or updating step includes executing processing to determine or update the control parameter so that a maximum duration of a normal operation state is set to a long period and a maximum duration of an intermittent operation state is set to a short period, wherein in the normal operation state power is continuously supplied to the position calculating device and the position calculating device executes continuous position calculation processing, and wherein in the intermittent operation state power is intermittently supplied to the position calculating device and the position calculating device executes intermittent position calculation processing, and
   when the imaging frequency of the imaging unit is at a low level, the determining or updating step includes executing processing to determine or update the control parameter so that the maximum duration of the normal operation state is set to a short period and the maximum duration of the intermittent operation state is set to a long period.

15. A non-transitory computer-readable medium including a program executable by a processor comprising computer code that causes execution of a position calculating control method in an imaging device including a position calculating device, the method comprising:
   measuring an imaging frequency of an imaging unit that executes processing to capture image data, the imaging frequency being a number of captured images over a predetermined period of time;
   determining or updating a control parameter as a condition for a transition of an operation state of the position calculating device based on the measured imaging frequency; and
   causing a transition of the operation state of the position calculating device based on the determined or updated control parameter.

* * * * *